(12) United States Patent
Krebs et al.

(10) Patent No.: US 10,279,891 B2
(45) Date of Patent: May 7, 2019

(54) SOFTWARE CONTROLLED STIFFENING OF FLEXIBLE AIRCRAFT

(71) Applicant: Google Inc., Mountain View, CA (US)

(72) Inventors: Mark Krebs, Mountain View, CA (US); Jonathan Daniel Brandmeyer, Mountain View, CA (US)

(73) Assignee: Google LLC, Mountain View, CA (US)

(*) Notice: Subject to any disclaimer, the term of this patent is extended or adjusted under 35 U.S.C. 154(b) by 151 days.

(21) Appl. No.: 15/171,279

(22) Filed: Jun. 2, 2016

(65) Prior Publication Data

US 2017/0349266 A1    Dec. 7, 2017

(51) Int. Cl.
| | | |
|---|---|---|
| *B64C 13/18* | (2006.01) | |
| *B64C 3/52* | (2006.01) | |
| *B64C 13/16* | (2006.01) | |
| *G05D 1/08* | (2006.01) | |
| *B64C 3/38* | (2006.01) | |

(Continued)

(52) U.S. Cl.
CPC .............. *B64C 13/18* (2013.01); *B64C 3/38* (2013.01); *B64C 3/52* (2013.01); *B64C 9/04* (2013.01); *B64C 13/16* (2013.01); *G05D 1/0841* (2013.01); *B64C 39/10* (2013.01)

(58) Field of Classification Search
CPC .. B64C 3/38; B64C 3/44; B64C 3/445; B64C 3/48; B64C 3/52; B64C 3/54; B64C 2003/543; B64C 9/04; B64C 13/18
See application file for complete search history.

(56) References Cited

U.S. PATENT DOCUMENTS

| | | |
|---|---|---|
| 3,132,828 A | 5/1964 | Edinger et al. |
| 5,082,207 A | 1/1992 | Tulinius |

(Continued)

OTHER PUBLICATIONS

Stewart, Jack. "Airbus Wants to Replace Satellites With High-Flying Drones." Wired.com. Conde Nast Digital, Jun. 1, 2016. Web. Jun. 3, 2016. https://www.wired.com/2016/06/airbus-new-drones-actually-high-flying-pseudo-satellites/.

(Continued)

*Primary Examiner* — Philip J Bonzell
(74) *Attorney, Agent, or Firm* — Foley & Lardner LLP

(57) ABSTRACT

Systems and methods for operating control surfaces of an aircraft. The method involves receiving, by an aircraft control system from one or more sensors, deflection information related to a shape and motion of an aircraft, and decomposing, by the aircraft control system, the deflection information into a detected modal state including a first known mode having a first mode strength. The method may further involve determining, by the aircraft control system, a first modal compensation based on the first mode strength, and identifying, by the aircraft control system, a desired control corresponding to a second known mode. The method may yet further involve determining a first control response for a control surface having a first modal weight and a second modal weight, based on the first modal compensation and the first modal weight, and determining a second control response for the control surface based on the desired control and the second modal weight. The method may still further involve generating a control command for the control surface based on the first control response and the second control response.

20 Claims, 10 Drawing Sheets

Figures 2A, 2B:
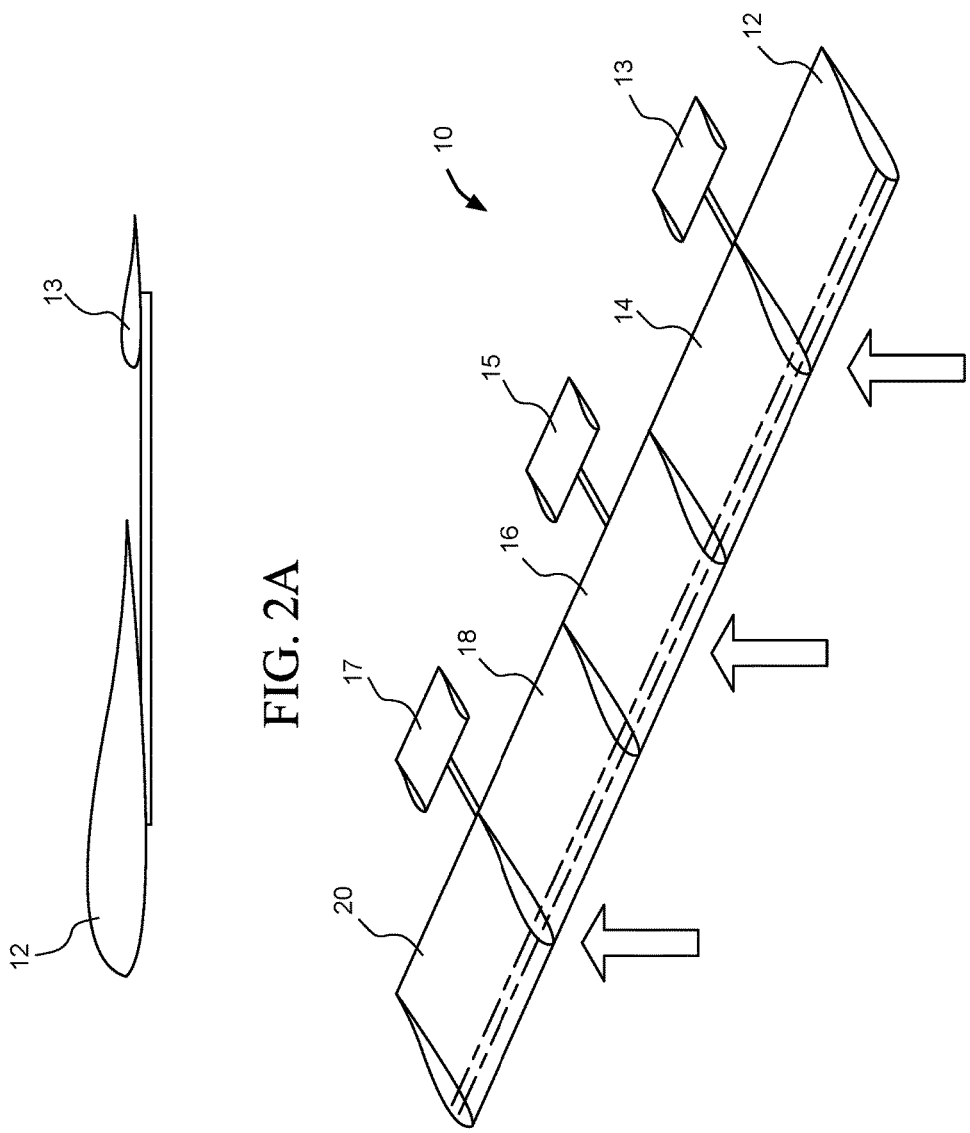

(51) Int. Cl.
*B64C 9/04* (2006.01)
*B64C 39/10* (2006.01)

(56) References Cited

U.S. PATENT DOCUMENTS

| | | | | |
|---|---|---|---|---|
| 5,531,407 | A * | 7/1996 | Austin | B64C 3/48 244/219 |
| 5,662,294 | A * | 9/1997 | Maclean | B63B 1/28 114/140 |
| 5,740,991 | A * | 4/1998 | Gleine | B64C 3/48 244/203 |
| 5,875,998 | A * | 3/1999 | Gleine | B64C 3/48 244/195 |
| 6,128,554 | A * | 10/2000 | Damotte | G05D 1/0061 244/223 |
| 6,375,127 | B1 * | 4/2002 | Appa | B64C 3/48 244/203 |
| 6,766,981 | B2 * | 7/2004 | Volk | B64C 9/22 244/195 |
| 7,802,756 | B2 | 9/2010 | Kendall et al. | |
| 8,473,122 | B2 * | 6/2013 | Simon | B64C 3/48 244/123.5 |
| 8,855,838 | B2 | 10/2014 | Berthier | |
| 9,014,877 | B2 * | 4/2015 | Golling | B64C 9/16 244/12.1 |
| 9,227,721 | B1 * | 1/2016 | Nguyen | B64C 9/14 |
| 9,399,508 | B2 * | 7/2016 | Lakic | B64C 3/38 |
| 2003/0205644 | A1 * | 11/2003 | Najmabadi | B64C 13/16 244/195 |
| 2008/0001028 | A1 | 1/2008 | Kendall et al. | |

OTHER PUBLICATIONS

Boussalis, et al., Control of a Simulated Wing Structure with Multiple Segmented Control Surfaces, 21st Mediterranean Conference on Control & Automation, IEEE, Platanias-Chania, Crete, Greece, pp. 501-506 (2013).

International Search Report & Written Opinion dated May 8, 2017 in Int'l PCT Patent Appl Serial No. PCT/US2016/069608.

* cited by examiner

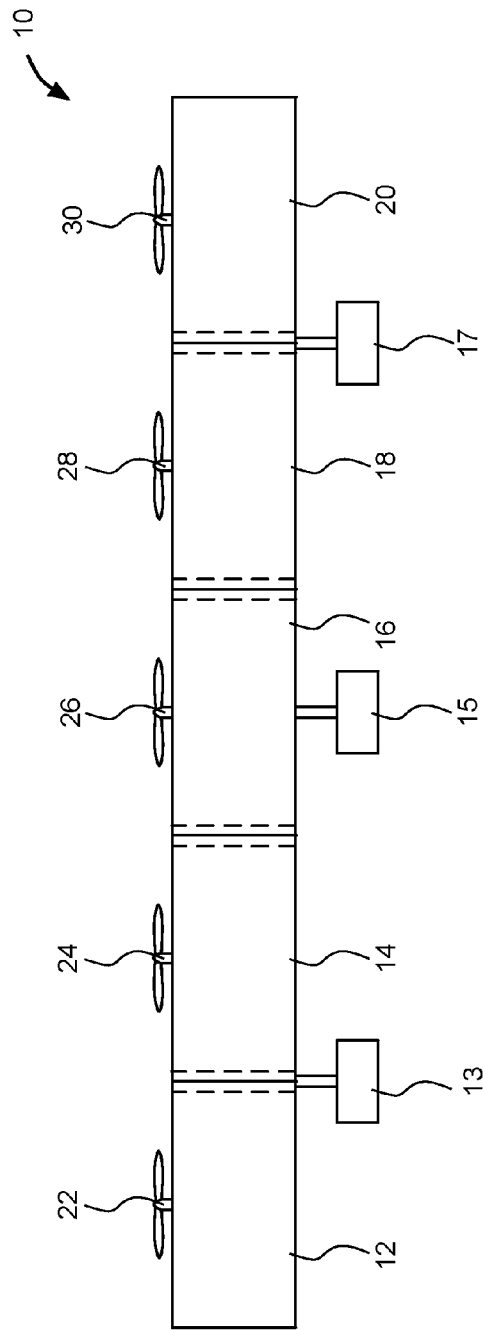
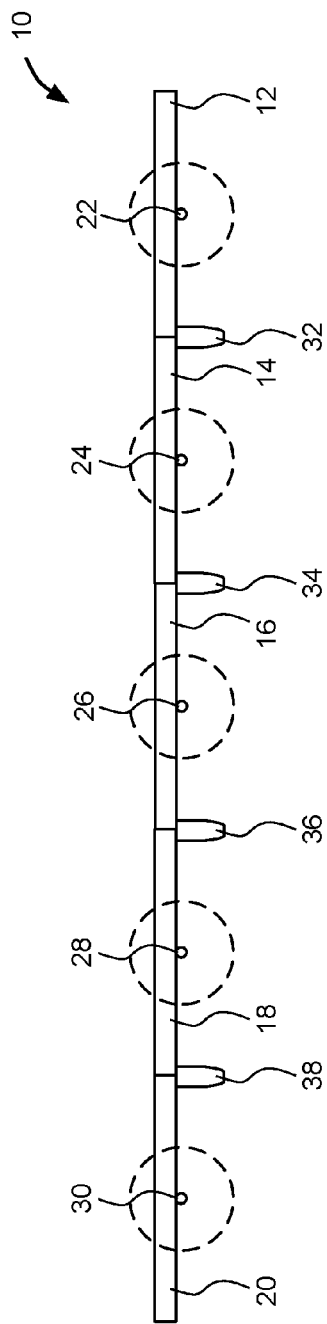
FIG. 1A
FIG. 1B

SOFTWARE CONTROLLED STIFFENING OF FLEXIBLE AIRCRAFT

I. BACKGROUND OF THE INVENTION

Flexible wing aircrafts are inexpensive, lightweight and fuel-efficient compared to typical torsionally rigid aircrafts. As such, flexible wing aircrafts are capable of high-altitude flight for extended durations and may be used in a variety of applications. However, flexible wing aircrafts generally have difficulty in maintaining stability during flight in light of loads on the aircraft causing undesirable bending or twisting or other undesired behavior. Such undesired behavior may result in the aircraft being unresponsive to commands or in the aircraft crashing.

II. SUMMARY OF THE INVENTION

The claims of the present disclosure recite systems and methods for operating control surfaces of a flexible wing aircraft during flight. Undesired behavior, such as structural vibrations or bending or twisting of a wing of an aircraft, may be related to dynamic modes of the aircraft. Dynamic modes may be related to dihedral of the aircraft or to other aircraft behavior. Systems and methods recited in the Claims may be useful for countering dynamic modes of a flexible wing aircraft. Countering of dynamic modes may be implemented by operating control surfaces of an aircraft to retrim the aircraft. Control surfaces may be operated so as to both counter dynamic modes of the aircraft and implement desired structural modes, such as a desired pitch mode. This overcomes drawbacks of previously-known systems.

In one implementation, a method for operating control surfaces of an aircraft may involve receiving, by an aircraft control system from one or more sensors, deflection information related to a shape and motion of an aircraft, and decomposing, by the aircraft control system, the deflection information into a detected modal state comprising a first known mode having a first mode strength. The method may further involve determining, by the aircraft control system, a first modal compensation based on the first mode strength, and identifying, by the aircraft control system, a desired control corresponding to a second known mode. The method may yet further involve determining a first control response for a control surface having a first modal weight and a second modal weight, based on the first modal compensation and the first modal weight, and determining a second control response for the control surface based on the desired control and the second modal weight. The method may still further involve generating a control command for the control surface based on the first control response and the second control response.

In one implementation, a system for operating control surfaces of an aircraft may involve one or more sensors configured to detect deflection information related to a shape and motion of the aircraft. The system may further involve an aircraft control system configured to receive the deflection information from the one or more sensors, decompose the deflection information into a detected modal state comprising a first known mode having a first mode strength, determine a first modal compensation based on the first mode strength, identify a desired control corresponding to a second known mode, determine a first control response having a first modal weight and a second modal weight, based on the first modal compensation and the first modal weight, determine a second control response based on the desired control and the second modal weight, and generate a control command based on the first control response and the second control response. The system may yet further involve one or more control surfaces configured to deflect in accordance with the control command.

III. BRIEF DESCRIPTION OF THE DRAWINGS

Figure 3A:
Figure 3B:
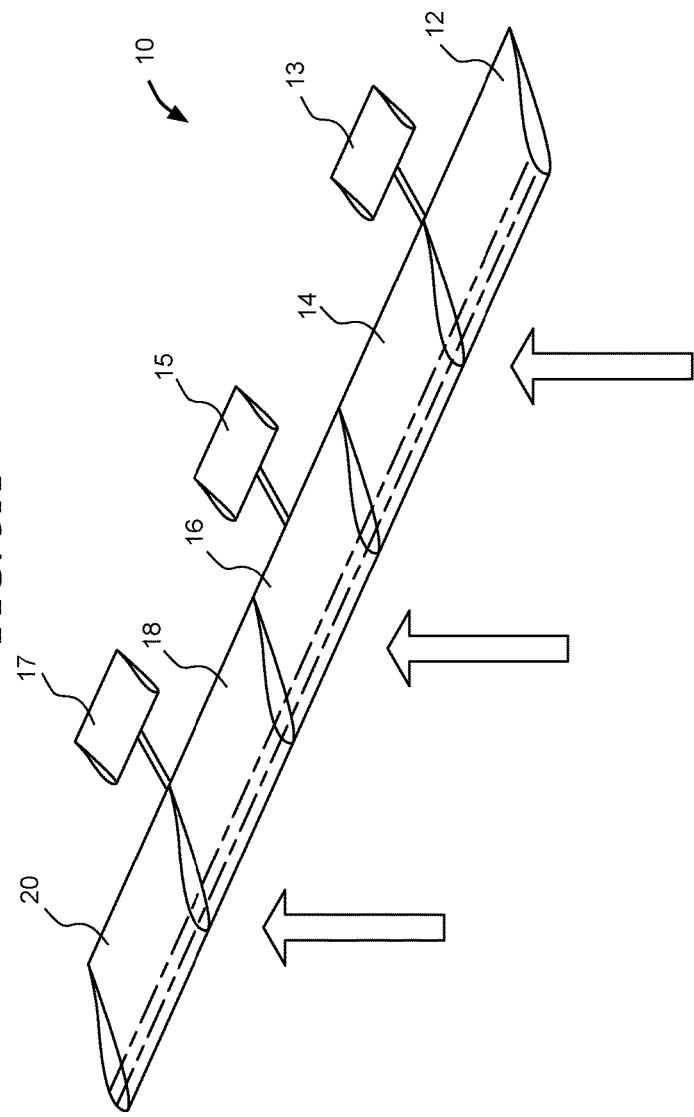
Figure 4A:
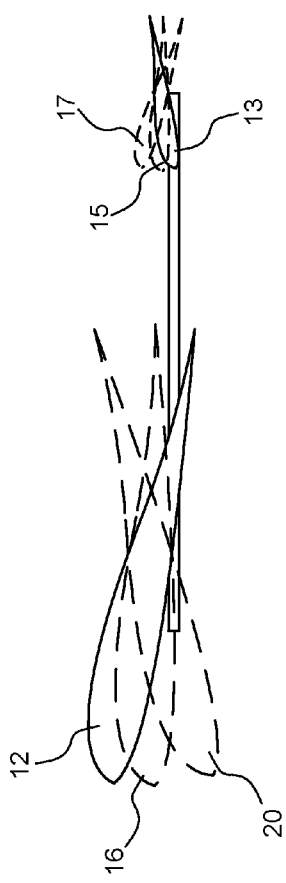
Figure 4B:
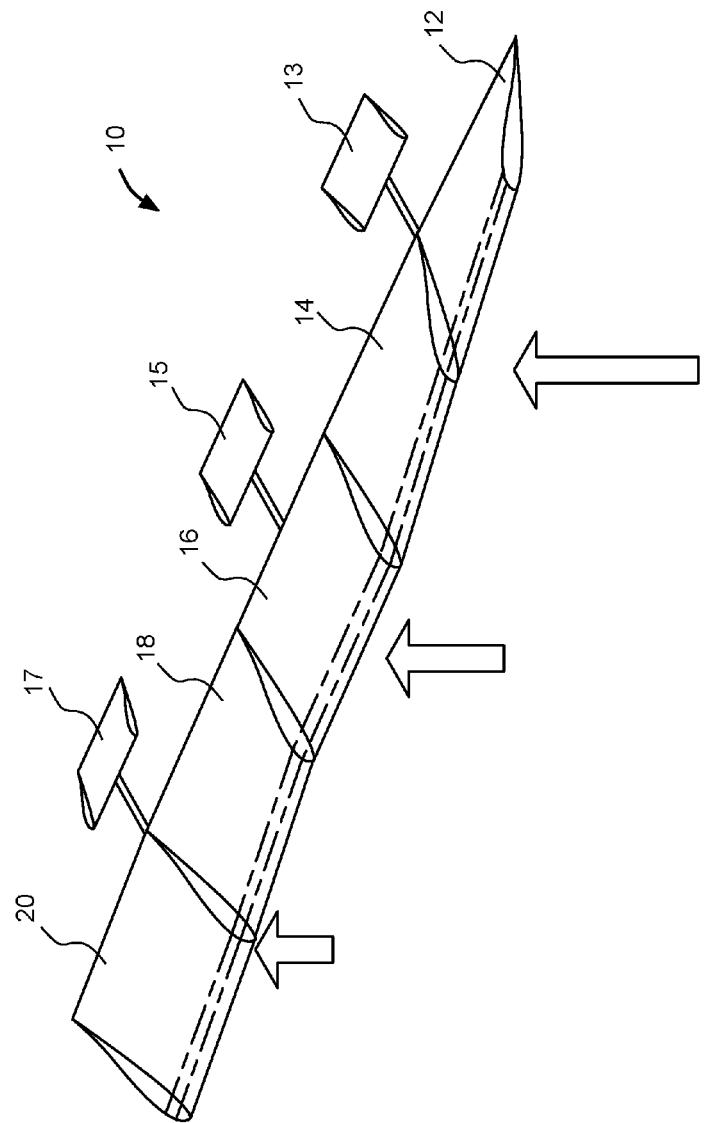
Figures 5A, 5B:
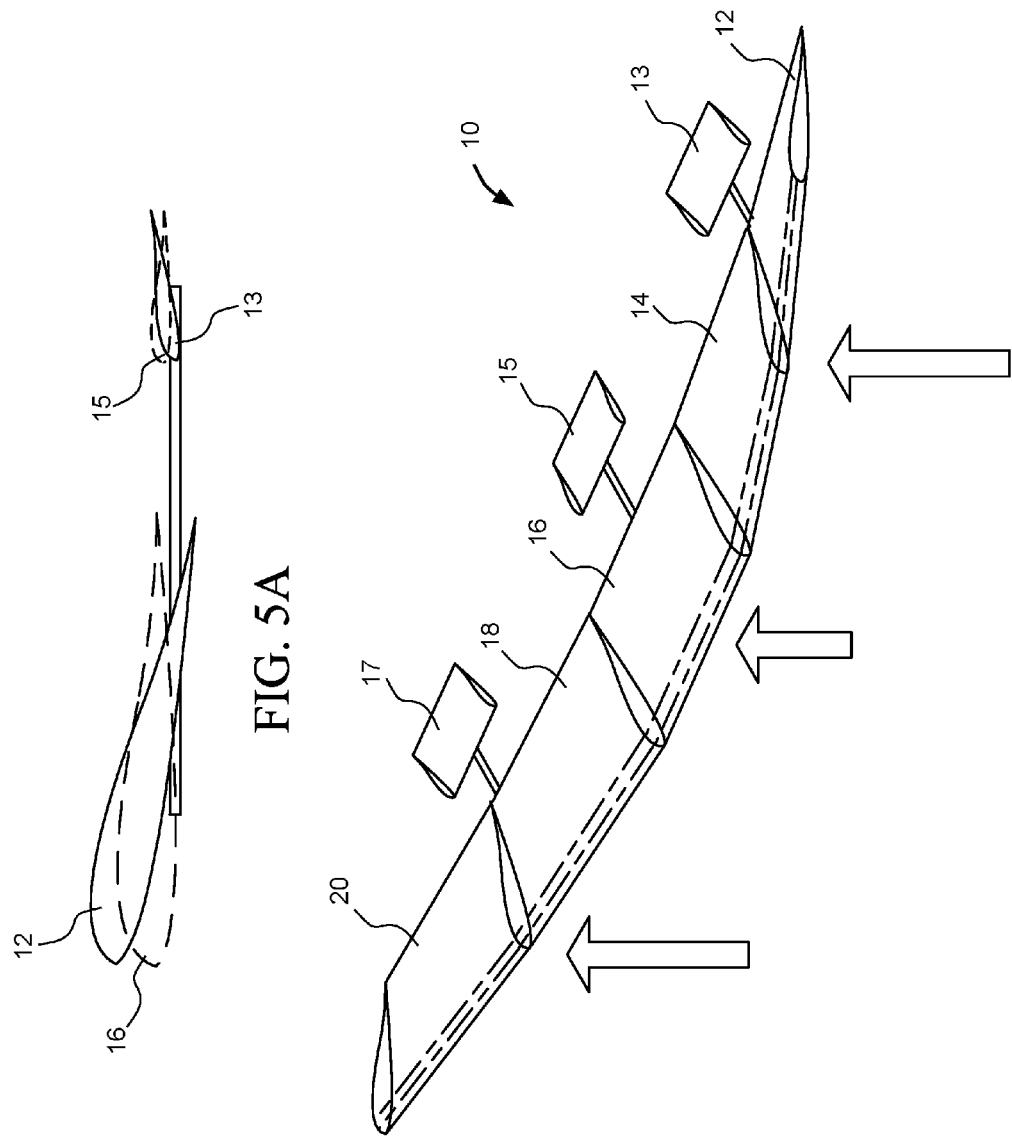
Figure 6:
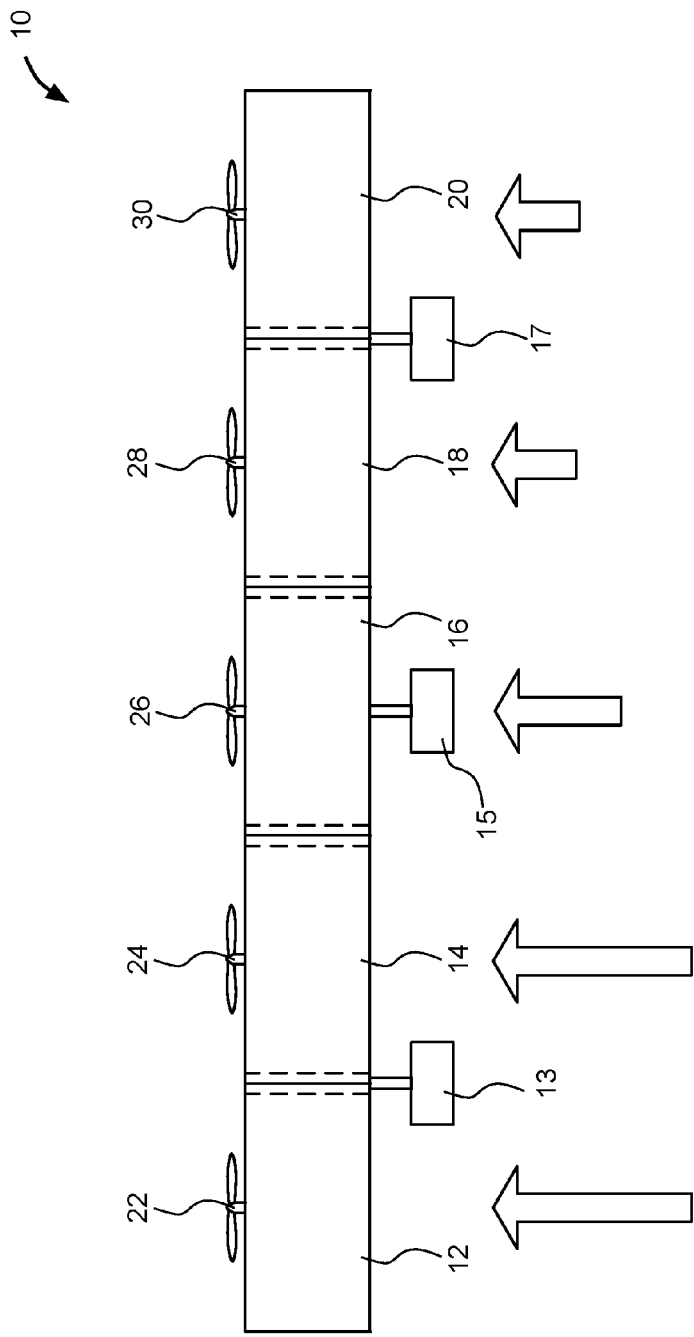
Figure 7A:
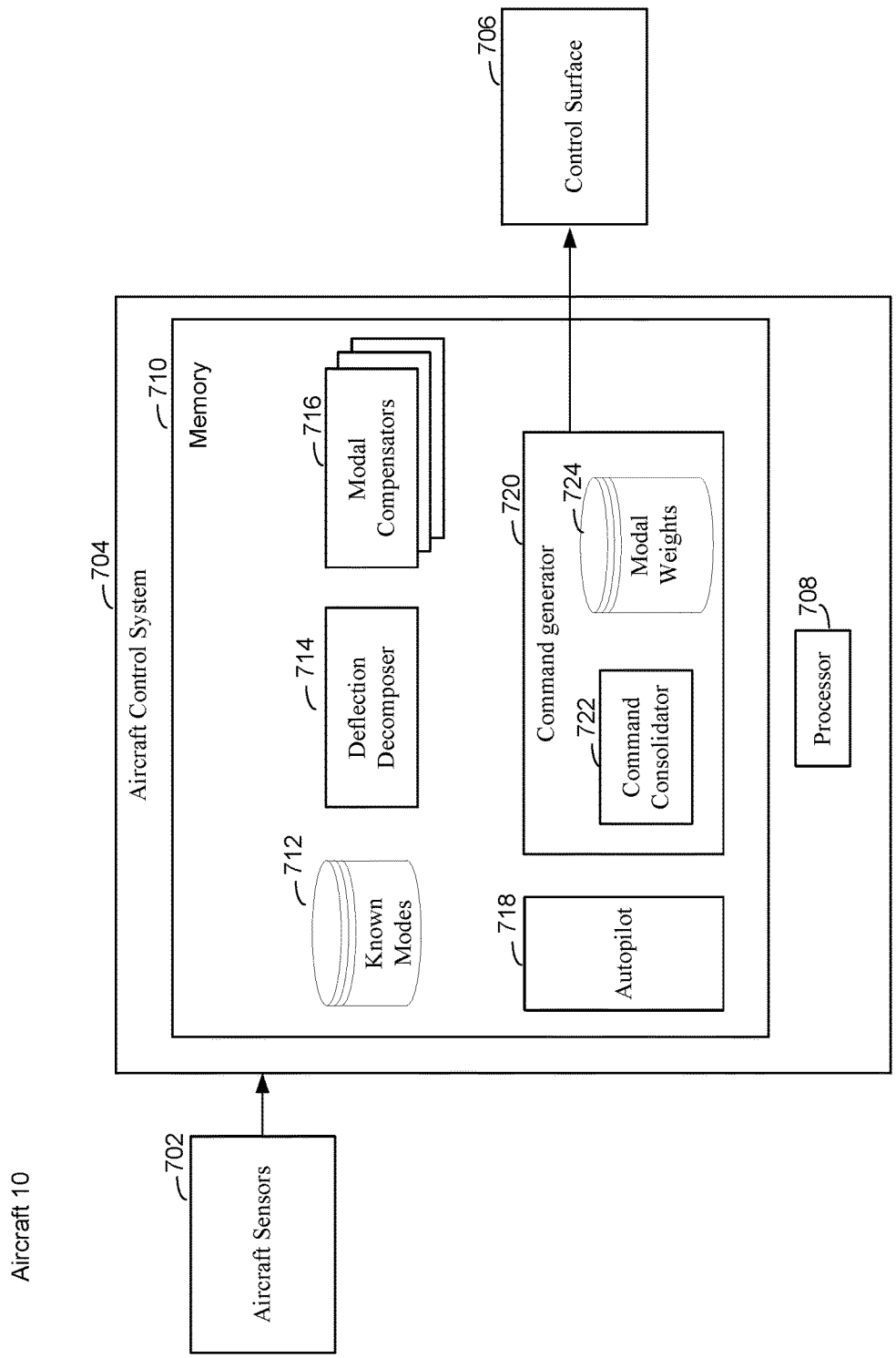
Figure 7B:
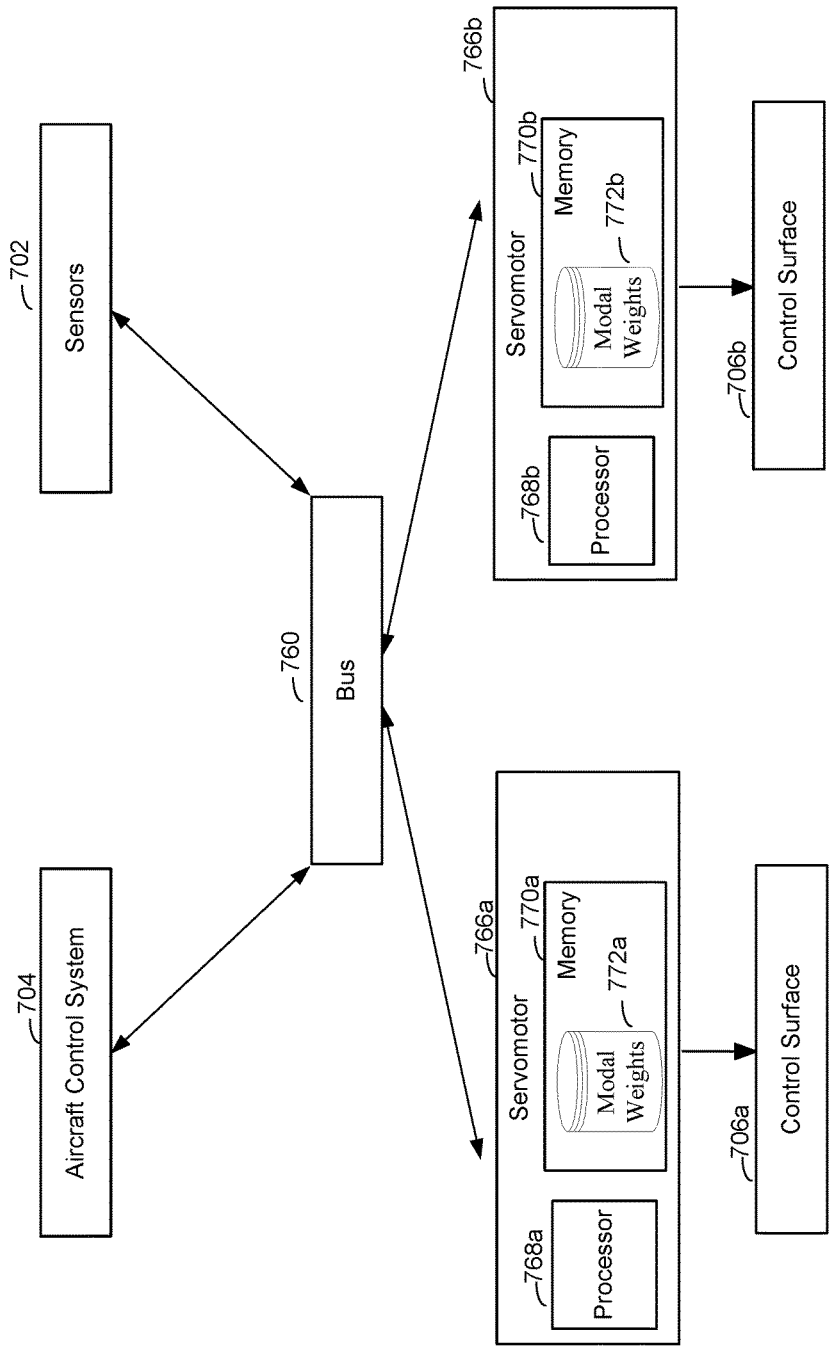
Figure 7C:
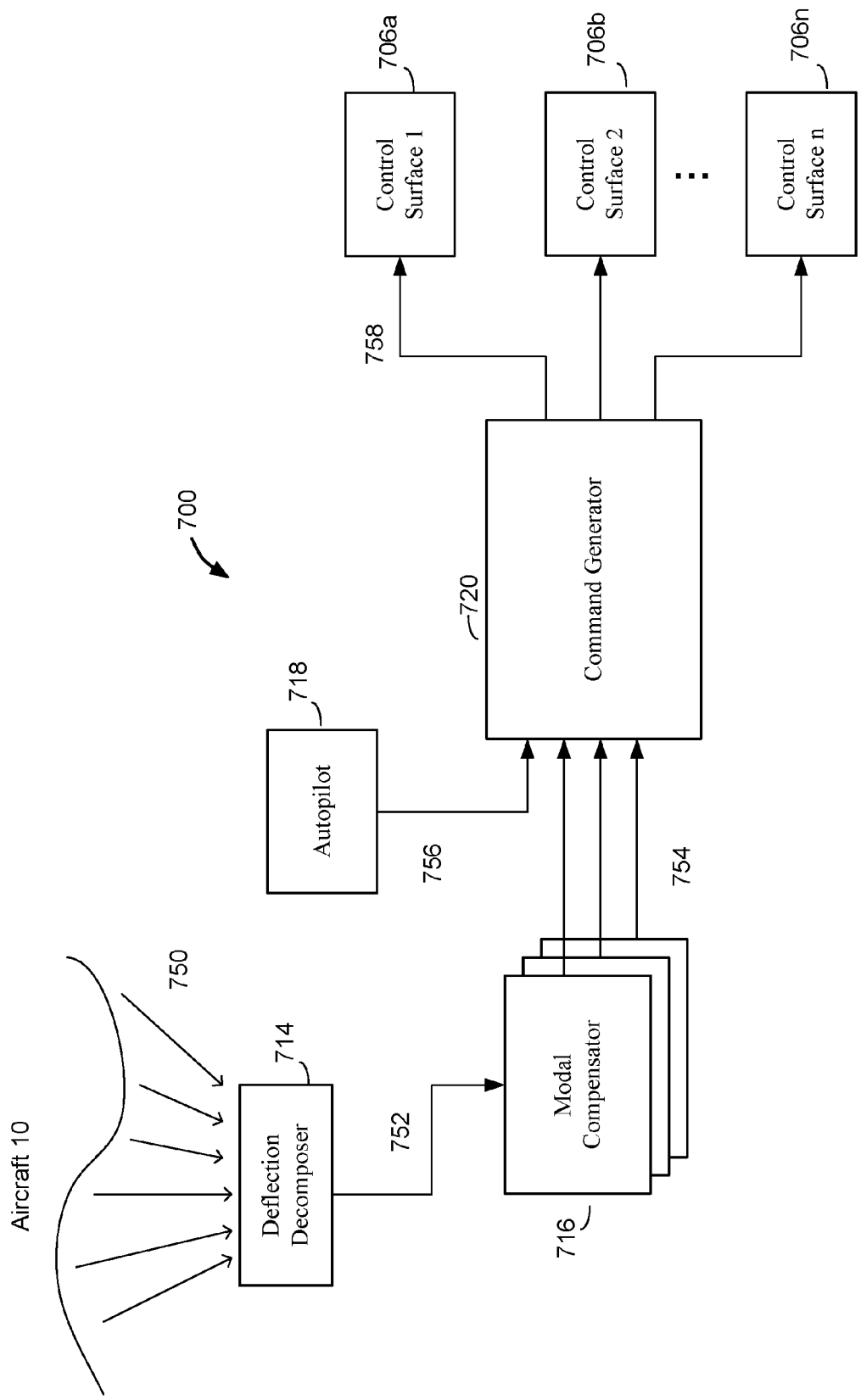
Figure 8:
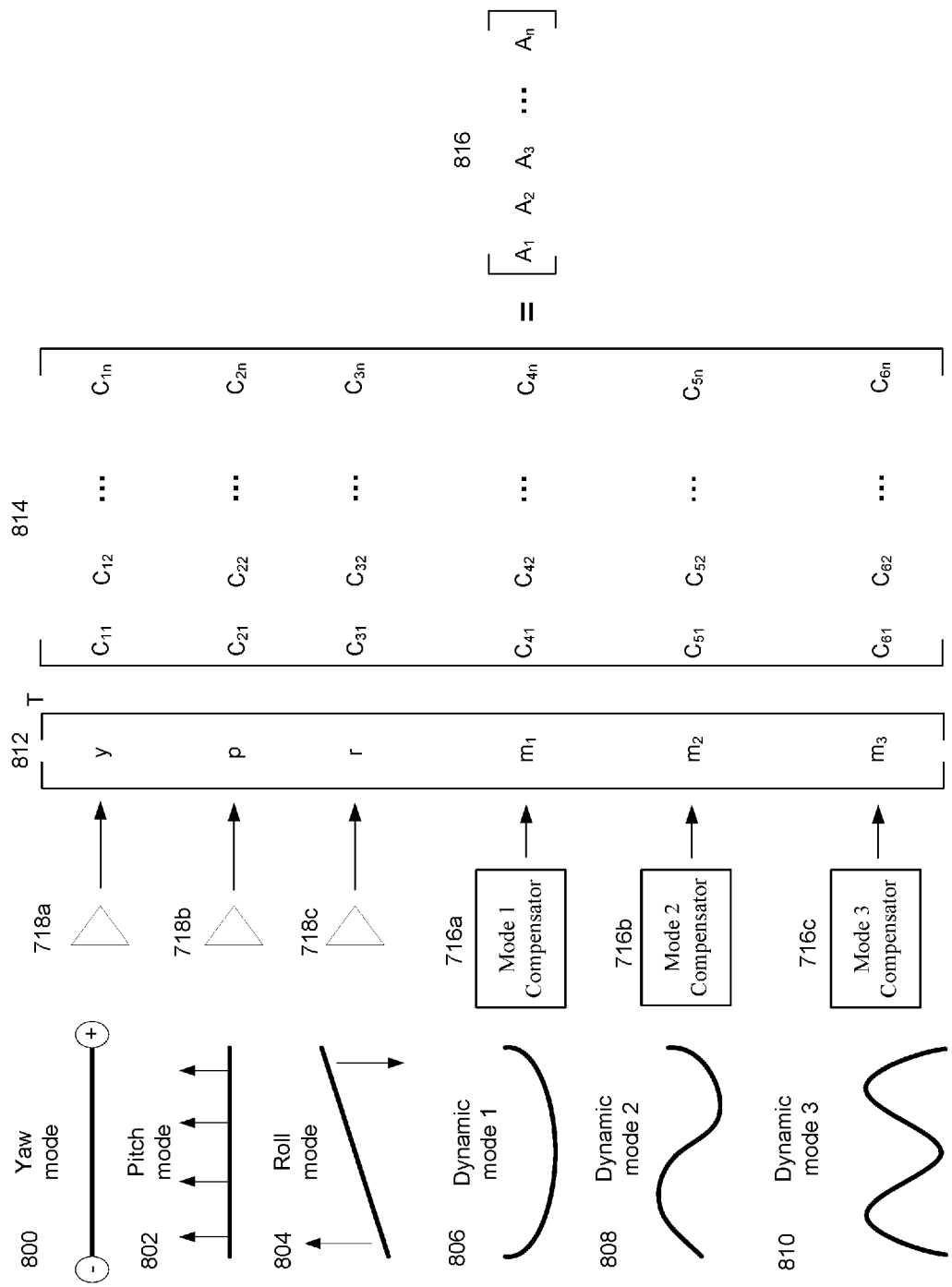

FIG. 1A depicts a top view of an aircraft comprising three control surfaces and a wing having five sections.
FIG. 1B depicts a front view of the aircraft of FIG. 1A.
FIG. 2A depicts a port side view of the aircraft of FIG. 1A.
FIG. 2B depicts a perspective view of the aircraft of FIG. 2A.
FIG. 3A depicts a port side view of the aircraft of FIG. 1A exhibiting pitch.
FIG. 3B depicts a perspective view of the aircraft of FIG. 3A.
FIG. 4A depicts a port side view of the aircraft of FIG. 1A exhibiting roll.
FIG. 4B depicts a perspective view of the aircraft of FIG. 4A.
FIG. 5A depicts a port side view of the aircraft of FIG. 1A exhibiting a dihedral.
FIG. 5B depicts a perspective view of the aircraft of FIG. 5A.
FIG. 6 depicts a port side view of the aircraft of FIG. 1A exhibiting yaw.
FIG. 7A is a block diagram depicting an overview of a control system and other components of an aircraft.
FIG. 7B is a block diagram depicting an overview of communication flow between a control system and other components of an aircraft.
FIG. 7C depicts a signal flow for an implementation of operating control surfaces of an aircraft.
FIG. 8 depicts a signal flow for another implementation of operating control surfaces of an aircraft.

IV. DETAILED DESCRIPTION

The systems and methods disclosed herein may be implemented on many types of aircraft. Any detailed description of an implementation is not intended to limit the enumerated claims.

Referring to FIGS. 1A and 1B, flexible wing aircraft 10 is described. Aircraft 10 may be an unswept flexible single-wing aircraft comprising five wing sections 12, 14, 16, 18 and 20, and three control surfaces 13, 15 and 17. The methods and systems described herein may be implemented on flexible wing aircraft having more or less than five sections and more or less than three control surfaces, or on other types of aircraft. Aircraft 10 may also include propellers 22, 24, 26, 28 and 30 for providing forward throttle. Similarly, the flexible wing aircraft may have more or less than five propellers. Aircraft 10 may also include four vertical legs 32, 34, 36 and 38 extending beneath aircraft 101 having landing gear affixed thereto.

Flexible Wing Sections

An aircraft on which the methods and systems described herein may be implemented may possess a flexible wing design. Aircraft 10 may be an unswept flexible single-wing aircraft, and may be very light weight. In another implementation, aircraft 10 may be a swept wing aircraft. Aircraft 10 may be constructed of mostly composite materials. In one implementation, aircraft 10 may be constructed of composite materials including, but not limited to, carbon fiber, graphite epoxy, Kevlar, polystyrene, Styrofoam, thin plastic, or any combination of these or any other appropriate material. Further, aircraft 10 may have a high aspect ratio, such as 20 to 1. Aircraft 10 may include a plurality of laterally connected sections. In one implementation, aircraft 10 includes five laterally connected sections, port wing sections 12 and 14, center wing section 16, and starboard wing sections 18 and 20. Each wing section may be configured to be capable of independently supporting its own weight during flight so as to minimize the load-bearing structure of aircraft 10. Aircraft 10 may include a main wing spar spanning lengthwise along the entire wingspan, such that the main wing spar may absorb various bending motions that occur during flight. Each wing section of aircraft 10 may include multiple ribs spaced apart lengthwise along the respective wing section to provide fore-to-aft structural support.

Aircraft 10 may have a flat configuration such that each wing section has substantially a same vertical height with respect to the ground, as illustrated in FIG. 1B. Alternatively, aircraft 10 may be configured to possess a predetermined dihedral such that port wing sections 12 and 14, and starboard wing sections 18 and 20 are elevated above center wing section 16, to provide aircraft 10 with more lateral stability during flight.

In one implementation, each wing section may include trailing edge flaps capable of independent control via the aircraft control system to provide additional stability during flight modes. In another implementation, the wing sections of aircraft 10 do not include a trailing-edge flap.

Control Surfaces

Aircraft 10 may possess a plurality of control surfaces positioned along the wingspan. In one implementation aircraft 10 includes port control surface 13, center control surface 15, and starboard control surface 17. Each control surface may be positioned longitudinally aft of the trailing edge of the flexible wing, symmetrically along the wingspan via a lightweight beam. Each control surface may be structurally similar to the flexible wing sections described above such that the control surfaces are lightweight.

In addition, each control surface may be independently electrically connected to the main aircraft control system such that each control surface may be individually controlled to respond to various local forces that occur during flight and flight maneuvers. In some implementations, groups of control surfaces may be controlled together and the groups may be controlled independently. Each control surface may apply a torsional force on the corresponding torsionally flexible wing section such that the wing section effectively controls local pitch in a predetermined manner.

As each control surface may be independently controllable, the control surfaces may be instructed via an aircraft control system to act in uniform or may act differently from each other to allow aircraft 10 to respond to forces during flight and to perform various flight maneuvers. The control surfaces may act as elevators to control pitch, as twisterons to control roll, and as benderons to control dihedral of aircraft 10 as described in more detail below.

A control surface may be associated with, or may comprise, a servomotor. The servomotor may cause the control surface to move so as to induce or apply force on aircraft 10. The servomotor may be analogue or digital, or a combination of the two. The servomotor may comprise a processor. The processor may be configured to determine a control response based on modal weights specific to a control surface, and may be further configured to generate a control command for the control surface based on the control response. An implementation of this is described below in reference to FIG. 7B.

Propellers

Aircraft 10 may include a plurality of propeller engines symmetrically positioned along the wingspan. The propellers may be selected from commercially available propellers configured to provide significant torque while having little weight. Each propeller engine may be independently electrically connected to the main aircraft control system such that individual propellers may provide specific throttle resulting in desired propeller torque. Although the Figures depict an implementation having five propellers, there may be more or less than five propellers affixed to aircraft 10. In various implementations, aircraft 10 may include 3 propeller engines, 7 propeller engines, 9 propeller engines, 10 propeller engines, or any number of propeller engines as may be appropriate.

Vertical Legs

Aircraft 10 may include vertical legs symmetrically located along the wingspan and extending from beneath aircraft 10. The vertical legs may be constructed out of lightweight materials and configured to house electronics to allow communication between the structures discussed above and the main aircraft control system. The vertical legs may also comprise landing gear and provide support for aircraft 10 on the ground. Although the Figures depict an implementation having four vertical legs, there may be more or less than four vertical legs affixed to aircraft 10.

Sensors

In one implementation, aircraft 10 comprises various sensors configured to communicate data to the main aircraft control system. The sensors may be commercially available sensors to provide information data indicative of wing shape and oscillatory movement of the wing during flight. The sensors may communicate data regarding speed, position, pitch, pitch rate, roll, roll rate, yaw, yaw rate, altitude, bending forces, torsion forces, and twist forces. Aircraft sensors may include an attitude sensor, altitude sensor, accelerometer, magnetometer, pressure sensor, strain gauge, global positioning system sensor, inclinometer, gyroscope, or any other appropriate sensor for detecting a shape or movement of aircraft 10.

Referring now to FIGS. 2-6, various flight configurations are discussed. As illustrated in FIG. 2, control surfaces 13, 15 and 17 are in a neutral position with no deflection. As a result, the lift forces on aircraft 10 may be essentially equal along the wingspan as depicted by the arrows. The following is a discussion of isolated flight configurations, however, these configurations may be implemented in isolation or in combination to provide a variety of other flight configurations.

Elevator

As shown in FIG. 3, control surfaces 13, 15 and 17 may be instructed to deflect in a uniform manner to act as elevators to control pitch. Flexible wing aircrafts are known to sometimes suffer from control reversal issues as a result of the torsional flexibility of the wing. The control surfaces may be positioned relative to the corresponding wing section so as to provide deflections that result in predictable responses by the corresponding wing sections. An upward deflection of control surfaces 13, 15 and 17, as shown in FIG. 3, may cause a nose-up pitching moment on the wing sections 22, 24, 26, 28 and 30 to thereby increase the angle of attack of the wing sections, resulting in increased lift along the wingspan (as depicted by the arrows) in a predictable manner.

Twisteron

As shown in FIG. 4, control surfaces 13, 15 and 17 may be instructed to act as twisterons to control roll. In the depicted implementation, port control surface 13 may be deflected upward and starboard control surface 17 may be deflected downward while center control surface 15 remains undeflected. In a typical torsionally rigid aircraft, ailerons may be used to control roll whereby a downward deflection of the port control surface causes a predictable increase in camber, resulting in increased lift, and an upward deflection of the starboard control surface causes a predictable decrease in camber resulting in decreased lift, which ultimately causes the plane to roll. However, due to the torsional flexibility, as described above, an upward deflection of control surface 13 may act in a reverse fashion ("twisteron"), resulting in a nose-up pitching moment on the corresponding wing sections 12 and 14 as wing twist is the primary response. Similarly, a downward deflection of control surface 17 may act in a reverse fashion resulting in a nose-down pitching moment on the corresponding wing sections 18 and 20. Therefore, the increased lift on the port side of aircraft 10 along with the decreased lift on the starboard side of aircraft 10 will result in causing aircraft 10 to roll.

Benderon

As shown in FIG. 5, control surfaces 13, 15 and 17 may be instructed to act as benderons to control the first bending of aircraft 10, i.e., dihedral. For purposes of this application, "benderon" may describe the phenomenon of control surfaces acting together to affect the bulk dihedral of the aircraft. As described above, wing twist may be a response to a deflection of port control surface 13 and/or starboard control surface 17. Therefore, an upward deflection of control surfaces 13 and 17 may act in a reverse fashion ("twisteron"), resulting in a nose-up pitching moment on the corresponding wing sections 12, 14, 18 and 20. The increased lift on both the port side and starboard side of aircraft 10 may cause aircraft 10 to bend upward, thereby affect the bulk dihedral of aircraft 10.

In addition, benderon action may be used to resist undesired bending forces and limit the bulk dihedral of aircraft 10. Control surfaces 13 and 17 may deflect downward to thereby decrease the angle of attack on wing sections 12, 14, 18 and 20 and consequently, the lift.

Throttle

As shown in FIG. 6, applying differential throttle as depicted by the arrows, to aircraft 10 may result in controlling yaw torque. As described above, aircraft 10 may have a number of propellers symmetrically positioned along the wingspan of aircraft 10 to provide individual throttle. As such, an increase of throttle equally among all the propeller engines, or in a symmetric distribution, of aircraft 10 will result in controlling the thrust of aircraft 10. Alternatively, as shown in FIG. 6, port propellers 22 and 24 may be instructed to increase throttle while starboard propellers 28 and 30 may be instructed to decrease throttle, thereby effecting a starboard yaw torque.

Modes

It will be helpful for understanding the below description to first briefly discuss the topic of modes of an aircraft. A mode of an aircraft may refer to a pattern of motion in which parts of an aircraft move sinusoidally with a similar frequency and with a phase relation to each other. A similar frequency may refer to a same frequency, or a plurality of frequencies within a small range of each other and may be referred to as a single fixed frequency or a frequency of the mode.

Modes are associated with structural resonances. Resonant vibration may be caused by an interaction between the inertial and elastic properties of the materials within a structure. Furthermore, resonant vibration may be the cause of, or at least a contributing factor to, many vibration related problems that occur in structures and operating machinery. These problems include failure to maintain tolerances, noisy operation, uncontrollability, material failure, premature fatigue, and shortened product life. For aircraft, vibration related problems may additionally lead to undesired bending, twisting, or other behavior of an aircraft, or to difficulty in operating an aircraft.

A mode may be defined by a modal frequency and a mode shape. A mode shape may be defined by the motion of one point relative to all others such as a sinusoidal wave, undergone by a structure when mechanically excited at a modal frequency, or resonant frequency. Modes are inherent properties of a structure and are not dependent on the instantaneous forces or loads acting on the structure. Modes may change if the material properties (mass, stiffness, damping properties), or boundary conditions (mountings) of the structure change. Mode shapes are unique relative to each other. That is, the motion of one point of the structure relative to another at resonance is unique.

Modes are a mathematical concept or construct, and are a convenient way of describing resonant vibration. Modes may be determined analytically or experimentally. Analytically speaking, modes may be solutions to differential equations of motion that describe the linear, stationary vibration of a structure. Experimentally, modal testing may be done by measuring deflections of a structure, and then interpreting or post processing them in a specific manner to define mode shapes.

Modes may be related to "deflections." A deflection of a structure may be defined as any forced motion of two or more points on a structure. A deflection may be a forced motion at a specific frequency. Deflections may depend on the load applied to a structure, and may change if the applied load changes. A deflection may be the motion of a set of points of a structure at a particular time, analogous to a snapshot of the motion of a plurality of points of the structure. Deflections may be expressed in terms of a summation of known modes. If a first known mode of a structure is expressed as $\sin(\omega_1 x+\theta_1)$, and a second known mode may be expressed as $\sin(\omega_2 x+\theta_2)$, then a deflection of the structure may be expressed as:

$$A \sin(\alpha t+\phi_1 t)e^{-r_1 t} \sin(\omega_1 x+\theta_1)+B \sin(\beta t+\phi_2 t)e^{-r_2 t} \sin(\omega_2 x+\theta_2),$$

where $A \sin(\alpha t+\phi_1 t)e^{-r_1 t}$ and $B \sin(\beta t+\phi_2 t)e^{-r_2 t}$ are damped time-varying amplitudes of the modes. A deflection of an aircraft expressed in this manner may be referred to as a modal state of the aircraft. An amplitude of a mode of a deflection or of a modal state of an aircraft may be related to a strength of a mode. As used herein, a strength of a mode may refer to an amplitude of a mode of a modal state, or may refer to a convolution of a mode shape with deflection information, or may refer to any other appropriate measure, direct or indirect, of a strength of a mode.

Aircraft may exhibit structural modes and dynamic modes. Structural modes may refer to modes related to rigid body responses exhibited by aircraft such as pitch. A pitch structural mode may be defined by a shape of an aircraft exhibiting pitch, such as aircraft 10 as depicted in FIG. 3A. Dynamic modes may refer to modes related to vibrations of an aircraft, or to bending or twisting of an aircraft. Dynamic modes may share some similarities with structural modes, or may even be the same as structural modes. Dynamic mode 1, depicted in FIG. 8, may be referred to as a dynamic mode. Dynamic mode 1 may be defined by a "U"-like shape of an aircraft, and it may be useful to for the sake of discussion or experimentation or design to refer to dynamic mode 1 as a "dihedral mode," because the mode shape of dynamic mode 1 is similar to the shape of an aircraft exhibiting dihedral. A large detected strength for a dihedral mode may indicate that wings of the aircraft may be at a substantial dihedral. A correspondence between a known mode and one or more aircraft behaviors, shapes or motions may be a subjectively determined correspondence, and may not relate to a strict mathematical or formal correspondence between the mode and an aircraft behavior. An informal correspondence between known modes and one or more aircraft behaviors, shapes or motions may be used to refer to potentially unstable aircraft states. A large dihedral may indicate that an aircraft is bending in such a way as to cause difficulty in flight control, or even catastrophic structural damage. Accordingly, if a dihedral mode is detected by an aircraft, an aircraft control system may retrim the aircraft to lower or counter the dihedral mode using methods and systems described herein. The actual dihedral of an aircraft may not be solely a function of the dihedral mode, and may be a function of other modes. Thus, countering the dihedral mode may not be an absolute guarantor of limiting wing dihedral to a safe level. Still, countering the dihedral mode may be useful in increasing the probability of limiting wing dihedral to a safe level.

Referring to FIG. 7A in a general overview, FIG. 7A depicts an implementation of aircraft control system 704 for operating control surface 706 of aircraft 10. Aircraft control system 704 may receive information from aircraft sensors 702. Aircraft control system 704 may comprise processor 708 and memory 710. Memory 710 may comprise known modes database 712, deflection decomposer 714, modal compensators 716, autopilot 718 and command generator 720.

More specifically, in one implementation, aircraft 10 may have aircraft sensors 702. Aircraft sensors 702 may include an attitude sensor, altitude sensor, accelerometer, magnetometer, pressure sensor, strain gauge, global positioning system sensor, inclinometer, gyroscope, or any other appropriate sensor for detecting a shape or movement aircraft 10. A shape or movement of aircraft 10 may include any position or movement of any part of aircraft 10 relative to any other part, a time-varying deflection of aircraft 10, or a strain measurement of aircraft 10. A shape of aircraft 10 may include a sharp bend in the wing, or an approximate parabolic bend in the wing, or a twisting of the wing, or a combination of any bending or twisting. A shape of aircraft 10 may also include a position of aircraft 10 relative to another object, or to the ground. A shape of aircraft 10 may correspond to the pitch of aircraft 10. A shape of aircraft 10 may also include a position of one point on aircraft 10 relative to another point on aircraft 10.

In some implementations, aircraft sensors 702 may detect a shape or movement of aircraft 10. Aircraft sensors 702 may detect a shape related to aircraft structural modes such as pitch of an aircraft, or may detect oscillations related to aircraft structural modes such as aircraft 10 oscillating between a high and low dihedral. Aircraft sensors 702 may detect any oscillatory movement of aircraft 10 or of parts of aircraft 10. Aircraft sensors 702 may also detect general movement of aircraft 10 such as a change in heading, a change in altitude, or any other general movement of aircraft 10 or of parts of aircraft 10.

In an implementation, aircraft 10 may comprise aircraft control system 704. Aircraft control system 704 may comprise one or more applications, services, routines, servers, daemons, or other executable logics for controlling an aircraft. These applications, services, routines, servers, daemons, or other executable logics may be integrated such that they may communicate with one another or be enabled to make calls to routines of each other. Aircraft control system 704 may be enabled to communicate, directly or indirectly, with aircraft sensors 702. This communication may be enabled via a bus, or via a radio or network connection, or in any other appropriate manner. Aircraft control system 704 may also be enabled to communicate, directly or indirectly, with a control surface 706. Similarly, this communication may be enabled via a bus, or via a radio or network connection, or in any other appropriate manner.

In some implementations, aircraft control system 704 may comprise processor 708 and memory 710. Processor 708 may include a microprocessor, ASIC, FPGA, etc., or combinations thereof. In many implementations, processor 708 may be a multi-core processor or an array of processors. Memory 710 may store machine instructions that, when executed by processor 708 may cause processor 708 to perform one or more of the operations described herein. The instructions stored in memory 710 may include instructions to determine desired structural and dynamic modes of aircraft 10. Memory 710 may include, but is not limited to, electronic, optical, magnetic, or any other storage devices capable of providing processor 708 with program instructions. Memory 710 may include a floppy disk, CD-ROM, DVD, magnetic disk, memory chip, ROM, RAM, EEPROM, EPROM, flash memory, optical media, or any other suitable memory from which processor 708 may read instructions. The instructions may include code from any suitable computer programming language such as, but not limited to, C, C++, C#, Java, JavaScript, Perl, HTML, XML, Python and Visual Basic.

In an implementation, aircraft control system 704 may comprise known modes database 712. Known modes may be modes of aircraft 10 determined analytically or experimentally, and may relate to natural resonance frequencies of aircraft 10. In an implementation, known modes of aircraft 10 may be predetermined. The modes may be predetermined for a particular aircraft, or may be predetermined for an aircraft type corresponding to a particular aircraft having an aircraft control system implementing one of the methods described herein, or may be predetermined in any other appropriate manner. The known modes may be determined experimentally. Known modes may be related to a material composition of aircraft 10 or on a structure of aircraft 10. Known modes may be known in that they are stored in known mode database 712, or may be known in that mode information may be received by aircraft control system 704 via radio or over a network connection or in any other appropriate manner. Known modes may be updated periodically by aircraft control system 704. If wear and tear on aircraft 10 is expected to change the known modes of aircraft 10 during a long flight of aircraft 10, aircraft control system 704 may update the known modes based on these expected changes, or in any other appropriate manner for any other appropriate reason. Aircraft control system 704 may perform or transmit a command to another aircraft control component to perform a diagnostic of the aircraft modes, the diagnostic providing information related to how known modes may have changed since takeoff or since a previous diagnostic.

In one implementation, aircraft control system 704 may comprise deflection decomposer 714. Deflection decomposer 714 may comprise an application, service, routine, server, daemon, or other executable logic for decomposing the deflection information received from aircraft sensors 702 into a detected modal state comprising a sum of known modes having mode strengths. Decomposing deflection information may involve deflection decomposer 714 processing the deflection information to generate a deflection signal that may be decomposed modally. If the deflection information includes a time series of data points related to acceleration at various points on aircraft 10 or a time series of data points related to strain at various points on aircraft 10, deflection decomposer 714 may process this information to generate a time-varying model of the shape and movement of aircraft 10. Deflection decomposer 714 may process the deflection information to generate a function that describes the shape of aircraft 10, the function describing the vertical position of any point located across the span of aircraft 10 as a function of span position and time. The deflection information may be processed to generate a time-varying model of the shape and movement of aircraft 10 in any other appropriate manner, including generating a two or three dimensional model of the shape or movement of aircraft 10.

In some implementations, the above-described processing may be done before aircraft control system 704 receives the deflection information, such that aircraft control system 704 receives processed deflection information. The processing may be performed by aircraft sensors 702, or other components of aircraft 10. In other implementations, deflection decomposer 714 performs this processing. In yet other implementations, this processing may be skipped, and deflection decomposer 714 may convert deflection information such as a series of data points related to strain at various points on aircraft 10 directly into known modes having mode strengths.

Deflection decomposer 714 may decompose deflection information into a detected modal state comprising a sum of detected known modes having mode strengths. The known modes may be predetermined modes, or may be modes updated in the manner described above. Decomposing deflection information into a modal state may involve convolving deflection information with a mode shape. Strain measurement deflection information may be convolved with each of a plurality of known modes shapes. The convolution of strain measurements and a known mode shape may equate to a convolution function that may represent how closely related a current shape of aircraft 10 is to the known mode shape. A detected modal strength may be obtained from the convolution of the strain measurement with the known mode shape.

In one implementation, aircraft control system 704 may comprise modal compensator 716. Modal compensator 716 may comprise one or more applications, services, routines, servers, daemons, or other executable logics for determining a modal compensation for a given mode strength. Modal compensator 716 may be a controller particular to a known mode, and aircraft control system 704 may comprise a plurality of modal compensators each corresponding to a known mode. Each modal compensator 716 may receive a mode strength corresponding to its particular known mode. Each mode compensator 716 may determine a modal compensation that counters or kills the received mode strength. In an implementation, if a modal compensator 716 corresponding to dynamic mode 1 (as depicted in FIG. 8) receives a mode 1 strength of 10, modal compensator 716 may determine a modal compensation of −10 to counter the detected strength of dynamic mode 1. In another implementation, modal compensator 716 may receive a mode strength, negate the mode strength, and perform a control space transform of that negated mode strength to represent the counter corresponding to the mode and mode strength as a scalar in control space, which may be a space for which modal weights, discussed below, are predetermined. In this manner, a modal compensation may be directly involved in operations with modal weights, and may be directed multiplied to modal weights.

In one implementation, aircraft control system 704 may comprise autopilot 718. Autopilot 718 may comprise one or more applications, services, routines, servers, daemons, or other executable logics for controlling an aircraft. These applications, services, routines, servers, daemons, or other executable logics may be integrated such that they may communicate with one another or be enabled to make calls to each other's routines. Autopilot 718 may determine or select desired structural modes for aircraft 10, in accordance with predetermined flight instructions. In another implementation, autopilot 718 may determine or select desired structural modes for aircraft 10, in accordance with instructions from a pilot or from a controller on the ground via radio. Predetermined flight instructions may include a turn when aircraft 10 is at a particular location or at a particular time, and autopilot 718 may determine a desired structural modes of the aircraft 10 comprising a roll shape. In another implementation, predetermined flight instructions may comprise a heading to be held when aircraft 10 is at a particular location or at a particular time. Autopilot 718 may determine a desired shape of the aircraft such that the aircraft maintains the heading. Autopilot 718 may make these determinations in accordance with a condition of aircraft 10 or of an environment of aircraft 10, in accordance with local weather conditions, an altitude of aircraft 10, or a shape of aircraft 10, or in any other appropriate manner.

Autopilot 718 may output control commands. Control commands may comprise a mode strength for a particular desired predetermined known mode such as a known structural mode. Autopilot 718 may output a pitch control command having a strength. The pitch control command may correspond to a known pitch mode. The pitch control command may be related to a predetermined flight instruction, and may correspond to aircraft 10 rising in altitude. The strength of the pitch control command may relate to how quickly aircraft 10 may rise in altitude. Autopilot 718, or a controller of autopilot 718, may perform a control space transform of that negated mode strength to represent the desired mode and mode strength as a scalar in control space, which may be a space for which modal weights are predetermined. In this manner, a control command may be directly involved in operations with modal weights, and may be directed multiplied to modal weights. An implementation of this is described below.

In some implementations, aircraft control system 704 may comprise command generator 720. Command generator 720 may comprise one or more applications, services, routines, servers, daemons, or other executable logics for generating control surface commands. Command generator 720 may include a command consolidator 722 and a database of modal weights 724. Command generator 720 may generate control surface commands based on a plurality of inputs that may include a modal compensation and a structural mode command.

In an implementation, command generator 720 may comprise a command consolidator 722 and a modal weights database 724. Command consolidator 722 may comprise one or more applications, services, routines, servers, daemons, or other executable logics for processing information received from modal compensator 716 or autopilot 718. Command consolidator 722 may receive a modal compensation for a first known mode from modal compensator 716 corresponding to the first known mode, and may further receive a desired control corresponding to a second known mode from autopilot 718. The modal compensation and the desired control may be related to a first mode strength and a second mode strength, respectively. The command generator 722 may perform a weighted addition of the modal compensation and the desired control, or of the first mode strength and the second mode strength, the weights being modal weights stored in control distribution weight database 724, to generate control surface commands. In other implementations, combination or addition of a modal compensation and a desired control may be performed by a servomotor for a control surface.

In an implementation, the modal weights stored in control distribution weight database 724 may be modal weights corresponding to a particular control surface and to a particular mode. Modal weights may be predetermined analytically or experimentally. Aircraft 10 may comprise port control surface 13, center control surface 15, and starboard control surface 17, as depicted in FIG. 1. Each control surface may have at least one modal weight corresponding to a known mode. The correspondence may relate to the ability of a control surface to effect or affect the known mode. Consider the shape of dynamic mode 1, depicted in FIG. 8. This "U"-like shape represents an aircraft with parts of a wing such as port wing sections 12 and 14, and starboard wing sections 18 and 20, displaced vertically upwards relative to an equilibrium "straight-line" shape. However, the center of the U shape, corresponding to a center of aircraft 10 or to center wing section 16, is not substantially vertically displaced. In this implementation, port control surface 13 and starboard control surface 17 correspond to regions of the U shape that are displaced vertically upwards, while center control surface 15 corresponds to a region of the U shape that is not substantially vertically displaced. Accordingly, center control surface 15 may have a low or even zero modal weight for dynamic mode 1, in part because any local forces, moments, or retrimming of aircraft 10 that it may induce are less likely to effect or affect dynamic mode 1, as compared to port control surface 13 and starboard control surface 17, which may have a higher modal weight for dynamic mode 1.

In one implementation, command consolidator 722 may process the modal compensation and the desired control to generate a vector comprising elements corresponding to the modal compensation and the desired control, and may then multiply that vector through a matrix comprising modal weights stored in modal weights database 724 to generate a plurality of control commands. An implementation of this is described in detail below in reference to FIG. 8. In some implementations, aircraft 10 may comprise control surface 706. As described above, control surfaces of aircraft 10 may be individually controlled. Control surface 706 may receive a control surface command from aircraft control system 704, and may respond accordingly. A control surface may be an elevator, which may receive a control surface command instructing the control surface to the tilt upwards to 10 degrees from a baseline. Control surface 706 may receive frequent commands from aircraft control system 704. The control surface may receive commands every $\frac{1}{1000}$ of a second, every $\frac{1}{100}$ of a second, every $\frac{1}{10}$ of a second, every second, every 10 seconds, or at any other appropriate interval. Control surface 706 need not receive commands at fixed intervals, and may receive commands based on when command generator 720 outputs a command for that particular control surface.

Referring to FIG. 7B in a general overview, FIG. 7B is a block diagram depicting an overview of communication flow between a control system and other components of an aircraft. FIG. 7B depicts a bus 760 configured to allow for communication between components of aircraft 10, and one or more servomotors 766 configured to determine a control response based on modal weights specific to a control surface 706. Servomotors 766 may be further configured to generate a control command for control surface 706 based on the control response. Servomotor 766 may be part of aircraft control system 704, or may be configured to communicate with aircraft control system 704.

In some implementations, servomotor 766 may comprise a processor 768, memory 770, and a modal weights database 772. Processor 768 may include a microprocessor, ASIC, FPGA, etc., or combinations thereof. In many implementations, processor 768 may be a multi-core processor or an array of processors. Memory 770 may store machine instructions that, when executed by processor 768 may cause processor 768 to perform one or more of the operations described herein. The instructions stored in memory 770 may include instructions to determine a control response based on modal weights specific to control surface 706. The instructions stored in memory 770 may include instructions to generate a control command for control surface 706 based on a control response. Memory 770 may include, but is not limited to, electronic, optical, magnetic, or any other storage devices capable of providing processor 768 with program instructions. Memory 770 may include a floppy disk, CD-ROM, DVD, magnetic disk, memory chip, ROM, RAM, EEPROM, EPROM, flash memory, optical media, or any other suitable memory from which processor 768 may read instructions. The instructions may include code from any suitable computer programming language such as, but not limited to, C, C++, C#, Java, JavaScript, Perl, HTML, XML, Python and Visual Basic.

In an implementation, memory 770 may comprise a modal weights database 772. Modal weights database 772 may comprise modal weights specific to a control surface. In some implementations, aircraft control system may transmit a modal compensation and a desired control, in vector form or otherwise, to servomotor 766. Servomotor 766 may multiply the modal compensation by a first modal weight to generate a first control response, and may multiply the desired control by a second modal weight to generate a second control response. The first control response and the second control response may be added to generate a control command, which may be transmitted to a control surface. In other implementations, a control command may be generated in any other appropriate manner based on a modal compensation and a desired control.

One advantage of this implementation is that it allows for a modal compensation and a desired control to be transmitted to multiple control surfaces over a bus 760. Each control surface may then generate a control command specific to a control surface based on the modal compensation and desired control. In some implementations, this may be advantageous relative to having aircraft control system 704 generate a specific command for a plurality of control surfaces and transmitting those commands over bus 760 to servomotors 766. In implementations where the number of control surfaces is high relative to the number of modal compensations and desired controls, it may be advantageous for aircraft control system 704 to transmit modal compensations and desired controls to servomotors rather than for aircraft control system 704 to transmit a specific control command for each control surface. This may allow for more efficient use of bus 760, in that less information need be transmitted over bus 760. Transmitting modal compensations and desired controls to servomotors may be advantageous in other implementations as well. In some implementations, a modal compensation and a desired control is transmitted to a servomotor, and a control command is transmitted to another servomotor.

Referring to FIG. 7C in a general overview, FIG. 7C depicts a signal flow for an implementation of operating control surfaces of an aircraft. FIG. 7C shows some interactions between components of aircraft 10.

Referring to FIG. 7C in more detail, in an implementation, at step 750, deflection decomposer 714 may receive sensor information from aircraft sensors 702 arrayed along aircraft 10. The sensor information may comprise strain measurements related to strain or vertical displacement from an equilibrium position or from any other appropriate reference position. This sensor information may be analyzed by deflection decomposer 714 to generate a mode strength for each of a plurality of known modes. Strain measurements may be processed to be expressed as a shape function describing a shape of aircraft 10 in terms of vertical position as a function of a location on a spanwise axis. The shape function may be convolved with a predetermined mode shape 1 function stored in known modes database 712. The result of that convolution may be integrated along the span of the aircraft to generate a mode 1 strength. The mode 1 strength may represent how strongly the detected shape of the aircraft corresponds to the shape of mode 1. Deflection decomposer 714 may perform this processing for each of a plurality of known modes to generate a plurality of mode strengths.

In one implementation, at step 752, modal compensator 716 may receive mode strengths corresponding to each of the plurality of known modes from deflection decomposer 714.

In an implementation, at step 754, command generator 720 may receive a modal compensation from modal compensator 716. Command generator 720 may receive a plurality of modal compensations from a plurality of modal compensators 716, each modal compensation corresponding to a dynamic mode to be countered. In one implementation, at step 756, command generator 720 may further receive one or more desired controls from autopilot 718 corresponding to a desired structural mode that autopilot 718 determines aircraft 10 should express. In another implementation, a desired control is a modal compensation. Command generator 720 may receive a desired control from an autopilot, from a modal compensator, or from any other appropriate aircraft component or combination of aircraft components. Command generator 720 may generate a plurality of control surface commands for each of a plurality of control surfaces. In one implementation, this may be accomplished for a first control surface by multiplying each received modal compensations and desired control, expressed in control space, by the first control surface's appropriate modal weights, and summing the results to generate a control surface command. The control surface command may be a number corresponding to degrees of tilt of an elevator, to power supplied to a propeller, or to any other appropriate control surface command. A more detailed description of this is described below in reference to FIG. 8.

In one implementation, at step 758, control surfaces 706 may receive control surface commands from command generator 720. Control surfaces 706 may comprise servomotors and actuators, such that the servomotors may receive the control surface command and cause the actuators to operate accordingly.

Referring to FIG. 8 in a general overview, FIG. 8 depicts one implementation of generating a control surface command. FIG. 8 depicts autopilot controllers and mode compensators outputting desired controls and modal compensations to command consolidator 722, and those desired controls and modal compensations being multiplied through a control distribution matrix comprising modal weights to generate control command 816.

In an implementation, known modes stored in known mode database 712 may include three structural modes, including yaw mode 800, pitch mode 802, roll mode 804, and three dynamic modes, including dynamic mode 1, dynamic mode 2, and dynamic mode 3. A mode strength corresponding to each of these modes may be transmitted to a controller specific to each mode. A detected mode strength for dynamic mode 1 may be transmitted to mode compensator 716a to generate a modal compensation, and a desired yaw mode strength may be transmitted to a controller 718a to generate a desired control. In other implementations, there may be a different number of known modes. In some other implementations, some but not all known modes will be controlled for.

In one implementation, three modal compensations and three desired controls may be received by command consolidator 722. The modal compensations and desired controls may be scalars expressed in control space. Command consolidator 722 may concatenate the modal compensations and desired controls into 1×6 strength vector 812. Each element of strength vector 812 may represent a strength of a desired mode or of a desired counter to a mode.

In an implementation, strength vector 812 may be multiplied though control distribution matrix 814 to generate control command vector 816. Control command vector 816 may comprise specific control surface commands $A_1$ through $A_n$ for n control surfaces. The elements of control distribution matrix 814 may be modal weights. The rows of the control distribution matrix may correspond to modes 800, 802, 804, 806, 808, and 810, and the columns may correspond to control surfaces 1 through n, and. In an implementation, the first column of control distribution matrix 814 may comprise modal weights of control surface 1 for each of the 6 modes respectively. $C_{31}$ may control surface 1's modal weight for a third mode, such as roll mode 804. Generally speaking, $C_{ij}$ may represent control surface j's ith modal weight.

In one implementation, multiplication of strength vector 812 through control distribution matrix 814 may yield control command vector 816. Each of the elements $A_1$ through $A_n$ of control command vector 816 may correspond to a control command for a particular control surface. $A_1$, which may be a control command for control surface 1, may be a scalar equal the sum ($yC_{11}+pC_{21}+rC_{31}+m_1C_{41}+m_2C_{51}+m_3C_{61}$). Each of the terms of the summation, such as $yC_{11}$, and $pC_{21}$, may be referred to as control responses, and the sum of the control responses may be a control command for a control surface. As described above, this scalar may correspond to degrees of tilt of an elevator, to power supplied to a propeller, or to any other appropriate control surface command. In this way, control surfaces of aircraft 10 may be operated so as to counter detected dynamic modes.

While the invention has been particularly shown and described with reference to specific implementations, it should be understood by those skilled in the art that various changes in form and detail may be made therein without departing from the spirit and scope of the invention described in this disclosure.

What is claimed:

1. A method for operating control surfaces of an aircraft having a flexible wing design, the method comprising:
   receiving, by an aircraft control system from one or more sensors, deflection information related to a shape and motion of an aircraft having a flexible wing design;
   decomposing, by the aircraft control system, the deflection information into a detected modal state comprising a first known mode having a first mode strength;
   determining, by the aircraft control system, a first modal compensation based on the first mode strength;
   identifying, by the aircraft control system, a desired control corresponding to a second known mode;
   determining a first control response for a control surface wherein the control surface has a first modal weight for the first known mode and a second modal weight for the second known mode, and the first control response for the control surface is determined based on the first modal compensation and the first modal weight;
   determining a second control response for the control surface based on the desired control and the second modal weight; and
   generating a control command for the control surface based on the first control response and the second control response.

2. The method of claim 1, further comprising:
   transmitting, by the aircraft control system to a servomotor, the first modal compensation and the desired control,
   wherein the determining a first control response, the determining a second control response, and generating a control command for the control surface are performed by the servomotor.

3. The method of claim 1, wherein the first control response corresponds to a first degree of tilt of the control surface and the second control response corresponds to a second degree of tilt of the control surface.

4. The method of claim 1, wherein the detected modal state comprises the second known mode having a second mode strength, and the desired control is a second modal compensation based on the second mode strength.

5. The method of claim 1, further comprising:
   determining a first control response for a second control surface wherein the second control surface has a third modal weight for the first mode and a fourth modal weight for the second mode, and the first control response for the second control surface is determined based on the first modal compensation and the third modal weight of the second control surface;
   determining a second control response for the second control surface based on the desired control and the fourth modal weight of the second control surface;
   generating a control command for the second control surface based on the first control response for the second control surface and the second control response for the second control surface.

6. The method of claim 1, wherein the deflection information comprises strain measurements.

7. The method of claim 1, wherein decomposing the deflection information into a detected modal state comprises convolving the deflection information with the first known mode.

8. The method of claim 1, wherein decomposing the deflection information into a detected modal state comprises convolving the deflection information with each of a plurality of known modes, each convolution with a known mode generating a strength for the known mode.

9. The method of claim 1, wherein the first known mode is a dynamic mode and the second known mode is a structural mode.

10. The method of claim 9, wherein identifying a desired control comprises determining, by an autopilot of the aircraft control system, a desired control.

11. A system for operating control surfaces of an aircraft having a flexible wing design, the system comprising:
    one or more sensors configured to detect deflection information related to a shape and motion of the aircraft having a flexible wing design;
    an aircraft control system configured to:
      receive the deflection information from the one or more sensors;
      decompose the deflection information into a detected modal state comprising a first known mode having a first mode strength;
      determine a first modal compensation based on the first mode strength; and
      identify a desired control corresponding to a second known mode;
    a servomotor for a control surface configured to:
      determine a first control response wherein the control surface has a first modal weight for the first known mode and a second modal weight for the second known mode, and the first control response for the control surface is determined based on the first modal compensation and the first modal weight;
      determine a second control response based on the desired control and the second modal weight;
      generate a control command based on the first control response and the second control response; and
    one or more control surfaces configured to deflect in accordance with the control command.

12. The system of claim 11, wherein the detected modal state comprises the second known mode having the second mode strength, and the desired control is a second modal compensation based on the second mode strength.

13. The system of claim 11, further comprising a second servomotor configured to:
    determine a first control response for a second control surface wherein the second control surface has a third modal weight and a fourth modal weight for the second mode, and the first control response for the second control surface is determined based on the first modal compensation and the third modal weight of the second control surface;
    determine a second control response for the second control surface based on the desired control and the fourth modal weight of the second control surface; and
    generate a control command for the second control surface based on the first control response for the second control surface and the second control response for the second control surface.

14. The system of claim 11, wherein the deflection information comprises strain measurements.

15. The system of claim 11, wherein the aircraft system is further configured to convolve the deflection information with the first known mode to decompose the deflection information into the detected modal state.

16. The system of claim 11, wherein the aircraft system is further configured to convolve the deflection information with each of a plurality of known modes, each convolution with a known mode generating a strength for the known mode to decompose the deflection information into the detected modal state.

17. The system of claim 11, wherein the servomotor is further configured to aggregate the first control response and the second control response to generate the control command.

18. The system of claim 17, wherein the first control response corresponds to a first degree of tilt of the control surface and the second control response corresponds to a second degree of tilt of the control surface.

19. The system of claim 11, wherein the first known mode is a dynamic mode and the second known mode is a structural mode.

20. The system of claim 19, wherein the aircraft control system comprises an autopilot configured to identify the desired control.

* * * * *